(12) United States Patent  
McGuire et al.

(10) Patent No.: US 7,785,470 B2
(45) Date of Patent: Aug. 31, 2010

(54) ENHANCED WATER TREATMENT FOR RECLAMATION OF WASTE FLUIDS AND INCREASED EFFICIENCY TREATMENT OF POTABLE WATERS

(75) Inventors: Dennis McGuire, Stuart, FL (US); Sanjeev Jakhete, Stuart, FL (US)

(73) Assignee: Ecosphere Technologies, Inc., Stuart, FL (US)

( * ) Notice: Subject to any disclaimer, the term of this patent is extended or adjusted under 35 U.S.C. 154(b) by 0 days.

(21) Appl. No.: 12/762,949

(22) Filed: Apr. 19, 2010

(65) Prior Publication Data

US 2010/0193360 A1 Aug. 5, 2010

Related U.S. Application Data

(63) Continuation of application No. 12/399,481, filed on Mar. 6, 2009, which is a continuation-in-part of application No. 12/184,716, filed on Aug. 1, 2008.

(51) Int. Cl.
*C02F 9/04* (2006.01)
*C02F 1/78* (2006.01)
*C02F 1/68* (2006.01)
*C02F 1/44* (2006.01)

(52) U.S. Cl. .............. 210/638; 210/151; 210/721; 210/669; 422/20

(58) Field of Classification Search ............ 210/638, 210/151, 721, 669
See application file for complete search history.

*Primary Examiner*—Walter D Griffin
*Assistant Examiner*—Cameron J Allen
(74) *Attorney, Agent, or Firm*—McHale & Slavin, P.A.

(57) ABSTRACT

Disclosed is a process for reclamation of waste fluids. A conditioning container is employed for receipt of waste material on a continuous flow for treatment within the container by immersible transducers producing ultrasonic acoustic waves in combination with a high level of injected ozone. The treated material exhibits superior separation properties for delivery into a centrifuge for enhanced solid waste removal. The invention discloses a cost efficient and environmentally friendly process and apparatus for cleaning and recycling of flowback, or frac water, which has been used to stimulate gas production from shale formations. The apparatus is mobile and containerized and suitable for installation at the well site.

7 Claims, 18 Drawing Sheets

|  | SODIUM | CALCIUM | MAGNESIUM | IRON | BARIUM | STRONTIUM | MANGANESE | BICARBONATE |
|---|---|---|---|---|---|---|---|---|
| SAMPLE 1 | | | | | | | | |
| RAW UNTREATED WATER | 6,169 | 773 | 127 | 4.6 | 60.6 | 38 | 1.569 | 1,342 |
|  | 5,580 | 543 | 95 | 1.4 | 28.5 | 25.1 | 1.075 | 942 |
| % REDUCTION | 9.547739 | 29.7542 | 25.1969 | 69.565 | 52.9703 | 33.9474 | 31.485 | 29.80626 |
| SAMPLE 2 | | | | | | | | |
| RAW UNTREATED | 4,642 | 275 | 88 | 32.4 | 27.8 | 20 | 0.709 | 1,305 |
| WATER | 4,303 | 218 | 68 | 6.4 | 25.7 | 16.4 | 0.55 | 1,226 |
| % REDUCTION | 7.302887 | 20.7273 | 22.7273 | 80.247 | 7.55396 | 18 | 22.426 | 6.05364 |

*FIG. 9*

ENHANCED WATER TREATMENT FOR RECLAMATION OF WASTE FLUIDS AND INCREASED EFFICIENCY TREATMENT OF POTABLE WATERS

CROSS-REFERENCE TO RELATED APPLICATIONS

This application is a continuation of U.S. patent application Ser. No. 12/399,481, filed Mar. 6, 2009 now U.S. Pat. No. 7,699,988, which is a continuation-in-part of non provisional application Ser. No. 12/184,716, entitled Enhanced Water Treatment for Reclamation of Waste Fluids and Increased Efficiency Treatment of Potable Waters, filed Aug. 1, 2008 now U.S. Pat. No. 7,699,994 which in turn is a continuation-in-part of provisional application 60/953,584, entitled Enhanced Water Treatment for Reclamation of Waste Fluids and Increased Efficiency Treatment of Potable Water, filed Aug. 2, 2007, the contents of which are hereby expressly incorporated by reference.

FIELD OF THE INVENTION

This invention related to the field of water treatment and, in particular to a process for reducing the need for off-site treatment such as in the case of reclaiming drilling fluids, flowback fluids, subterranean oil and gas wells using produced water, and enhancing ozone injection processes for potable water.

BACKGROUND OF THE INVENTION

Worldwide, oil and gas companies spend more than $40 billion annually dealing with produced water from wells. The global direct costs from hauling water for treatment off-site alone will surpass $20 billion in 2007, with expenses skyrocketing in the next few years.

The US Department of Energy (DOE) has called produced water "by far the largest single volume byproduct or waste stream associated with oil and gas production." The DOE further terms its treatment a serious environmental concern and a significantly growing expense to oil and gas producers.

In 2007, the world's oil and gas fields will produce over 80 billion barrels of water needing processing. The average is now almost nine barrels of produced water for each barrel of oil extracted. And the ratio of water to hydrocarbons increases over time as wells become older. That means less oil or gas and more contaminated water as we attempt to meet rising global energy needs.

By way of example, in rotary drilling a by-product of the drilling process is a waste fluid commonly referred to as "drilling fluids" which carries cuttings and other contaminants up through the annulus. The drilling fluid reduces friction between the drilling bit and the sides of the drilling hole; and further creates stability on the side walls of an uncased drilling hole. The drilling fluid may include various constituents that are capable of creating a filter cake capable of sealing cracks, holes, and pores along the side wall to prevent unwanted intrusion from the side wall into the drilled shaft opening. Water based drilling fluid's result in solid particles that are suspended in the water that makes up the fluid characteristics of the drilling fluid. Drilling fluid's can be conditioned to address various processes that may include water soluble polymers that are synthesized or naturally occurring to try to be capable of controlling the viscosity of the drilling fluid. The drilling fluid principle is used to carry cuttings from beneath the drilling bit, cool and clean the drill bit, reducing friction between the drill string and the sides of the drill hole and finally maintains the stability of an uncased section of the uncased hole.

Of particular interest in this example of a drilling fluid is the commonly referred to 91$b$ drilling mud. Once this fluid is expelled, for purposes of on-site discharge the specific gravity of water separated need to be about 8.34 lbs per gallon to meet environmental discharge levels. One commonly known process is to use a centrifuge which is capable of lowering the 9 pound drilling mud to approximately 8.5 pounds per gallon. However, this level is unacceptable for environmental discharge limit and it would then be necessary to induce chemical polymers to flocculate the slurry and further treat the volatile organic compounds (VOC's) which are emitted as gases from certain solids or liquids. The VOC's are known to include a variety of chemicals some of which may have short or long term adverse health effects and is considered an unacceptable environmental discharge contaminant. Unfortunately, the use of polymers and a settling time is so expensive that it economically it becomes more conducive to treat the waste off-site which further adds to the cost of production by requiring off-site transport/treatment or shipped to a hazardous waste facility where no treatment is performed.

Thus, what is need in the industry is a reclamation process for reducing the need to treat industrial waste off-site and further provide an on-site treatment process for use in reclaiming water.

In addition there are many gas fields, most notably in North America, that contain enormous amounts of natural gas. This gas is trapped in shale formations that require stimulating the well using a process known as fracturing or fracing. The fracing process uses large amounts of water and large amounts of particulate fracing material (frac sands) to enable extraction of the gas from the shale formations. After the well site has been stimulated the water pumped into the well during the fracing process is removed. The water removed from the well is referred to as flowback fluid or frac water. A typical fracing process uses from one to four million gallons of water to fracture the formations of a single well. Water is an important natural resource that needs to be conserved wherever possible. One way to conserve water is to clean and recycle this flowback or frac water. The recycling of frac water has the added benefit of reducing waste product, namely the flowback fluid, which will need to be properly disposed. On site processing equipment, at the well, is the most cost effective and environmentally friendly way of recycling this natural resource.

It takes approximately 4.5 million gallons of fresh water to fracture a horizontal well. This water may be available from local streams and ponds, or purchased from a municipal water utility. This water must be trucked to the well site by tanker trucks, which carry roughly five thousand gallons per trip. During flowback operations, approximately 300 tanker trucks are used to carry away more than one million gallons of flowback water per well for offsite disposal. For a 3 well frac site these numbers will increase by a factor of three.

The present invention provides a cost-effective onsite water recycling service that eliminates the need to truck flowback to a disposal pit, a holding pond, or recycling facility miles away.

SUMMARY OF THE INVENTION

The instant invention is directed to a reclamation process that introduces high intensity acoustic energy and triatomic molecules into a conditioning container to provide a mechanical separation of materials by addressing the noncovalent forces of particles or, van der Waals force. The conditioning tank provides a first level of separation including an oil skimmer through an up flow configuration with discharge entering a centrifuge. The conditioning container and centrifuge addressing a majority of drilling fluid recovery operations, fluid cleaning, barite recovery, solids control, oily wastes, sludge removal, and so forth.

Water from the centrifuge is directed through a filtration process, sand or multimedia, for removal of large particulates before introduction through activated carbon filters for removal of organics and excess ozone. Discharge from the carbon filters is directed to a clean water tank for distribution to utilities as well as for water makeup for the ozone injection process and filtration backwash.

The instant invention also discloses a cost efficient and environmentally friendly process and apparatus for cleaning and recycling of flowback, or frac water, which has been used to stimulate gas production from shale formations. The invention also has the ability to conserve water and reduce the amount of waste disposal. The ability to perform this process adjacent the well head eliminates transportation costs to a central processing facility and eliminates the vehicular impact on the areas surrounding the gas fields.

Thus an objective of the invention is to provide an on-site process to treat waste fluids.

Still another objective of the invention is to provide an on-site process that will lower the cost of oil products by reducing the current and expensive processes used for off-site treatment of waste fluids.

Another objective of the invention is to provide an on-site process that will extend the life of fields and increase the extraction rate per well.

Yet still another objective of the instant invention is to lower the specific gravity of the 9 pound mud to approximately the specific gravity of water allowing for reclamation and reuse.

Still another objective of the instant invention is to eliminate the need to recycling all drilling fluid due to current cost burdens created by the need of polymers for further settlement of contaminants.

Still another objective of the instant invention is to teach the combination of ultrasonic and hydrodynamic agitation in conjunction with ozone introduction into a closed pressurized container whereby the cavitations cause disruption of the materials allowing the ozone to fully interact with the contaminated flow back water for enhancement of separation purposes. In addition, anodes in the container provide DC current to the flow back water to drive the electro precipitation reaction for the hardness ions present with the flow back water.

Yet another objective of the instant invention is to reduce 9 pound drilling mud into a separation process wherein the water separated has a specific gravity of about 8.34.

Still another objective is to teach a process of enhanced ozone injection wherein ozone levels can be reduced be made more effective.

Another objective of the invention is to provide a cost effective and environmentally friendly process and apparatus for cleaning and recycling frac water at the well site using transportable equipment that is packaged within a trailer in a modular fashion to minimize down time and make repair easier and more cost efficient.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 9 show data tables representing two samples of flow back water. Each data table sets forth the contaminants within the flow back water prior to treatment in the main reaction tank as compared to the same contaminants subsequent to treatment in the main reaction tank.

DETAILED DESCRIPTION OF THE PREFERRED EMBODIMENT

Figure 1A:
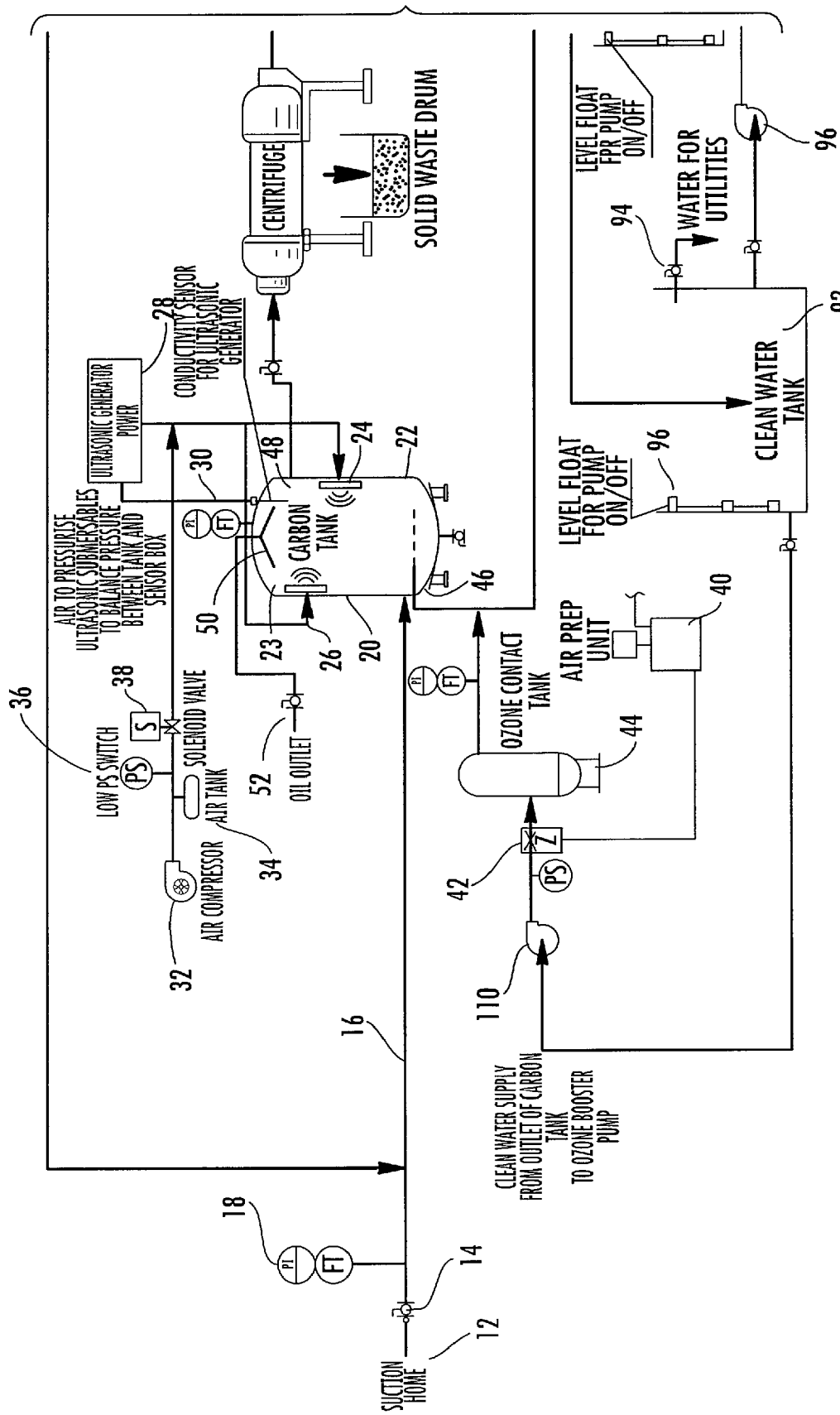
FIGS. 1A & 1B is a flow schematic of drawing fluid reclamation process.
Figure 1B:
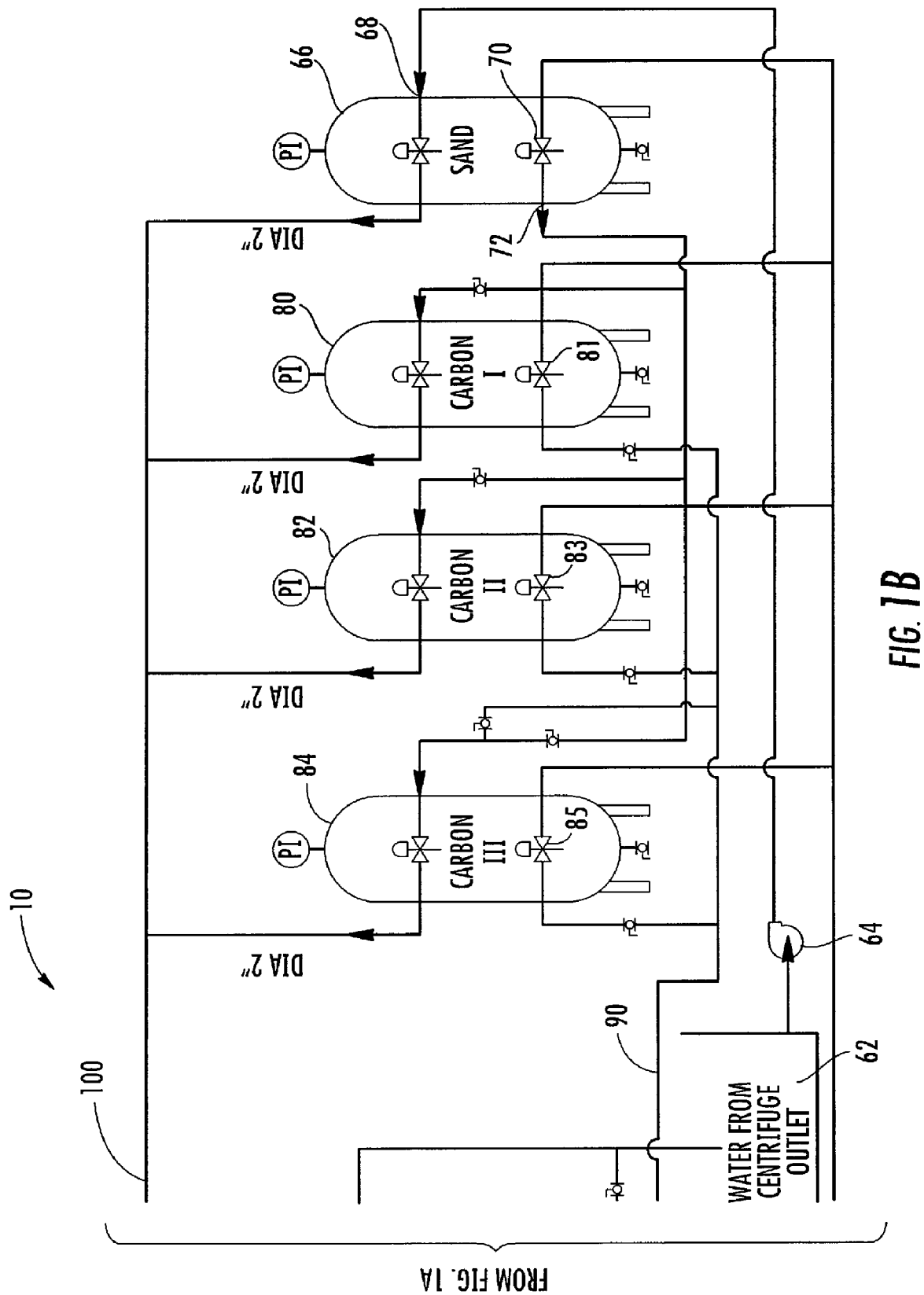

Now referring to FIG. 1 set forth is the preferred drawing fluid reclamation process (10) having an inlet (12) shown with a 3 inch section hose and a shutoff valve (14). Pressurized drilling fluid is directed through an inlet pipe (16) monitored by a pressure gauge (18) and inserted into conditioning tank (20) along a lower end (22) wherein the drilling fluid fills the conditioning container (20) on an upward flow. Ultrasonic acoustic transducers (24) and (26) are depicted at different locations in the conditioning container, the ultrasonic transducers powered by a control panel (28) and monitored by a conductivity sensor (30).

The ultrasonic sensors are operated by use of an air compressor (32) with pressurized air stored within a tank (34) monitored by a low pressure switch (36) and solenoid (38) for control of flow for production of the acoustic energy into the transducers (24) and (26). An ozone generator (40) is used to introduce ozone through an injector (42) in storage into an ozone contact tank (44) before introduction into the lower end (22) of the conditioning container (20) and inlet manifold (46). The preferred ultrasonic device is driven by silver braised magnetostrictive transducers, with all wetted surfaces being 316 stainless steel. The resonant frequency of the immersible is preferably between 16 kHz or 20 kHz. When multiple generators are used they can be synchronized to operate at a single resident frequency. The use of the immersible configuration allows placement within the conditioning container so as to allow for continuous treatment thereby placing an intense ultrasonic energy into the controlled volume of material as it passes by the multiple vibrating surfaces.

By way of example, drilling fluid (16) introduced into the conditioning container is ozonated through the manifold (46) with the ozonated drilling fluid passing through the acoustic energy provided by the transducers (24) and (26) with conditioned drilling fluid removed from the conditioning container at outlet (48). A second outlet (50) is provided for removal of petroleum products such as oil that form along the surface and can be collected through the manifold (50) and directed to an oil outlet (52) for collection and disposal. The ozonated and ultrasonically treated drilling fluid that is directed through outlet (48) is placed into the inlet (54) of a centrifuge (56) which allows for solid waste removal (60).

The slurry is the directed to an open container (62) for use in post treatment. Post treatment is made possible by repressurization of the slurry by transfer pump (64) for introduction into a sand filter (66) at inlet (68). The sand filter permits removal of the remaining particulates into a micron level and the filtered slurry is passed through directional valve (70) to outlet (72) and introduction into parallel position activated carbon filters (80), (82) and (84). The activated carbon filters provide removal of any remaining organics as well as reduces and eliminates any excess ozone with the effluent collected by manifold (90) replacement into a clean water filter tank (92). The clean water tank is expected to have water with a specific gravity of approximately 8.34 making it available for environmental discharge or other uses with the utilities (94). The level float (96) provides operation of the transferred pump (64) from maintaining a level in the clean water tank for distribution to the utilities. The clean water tank further allows for use of the reclaimed water for regeneration of the activation carbon by use of transfer pump (96) wherein backwashing of the sand filter (66) and carbon filters (82) and (84) is made possible through directional valve (70), (81), (83), and (85). Manifold collecting the backwashed water (100) is returned to the inlet pipe (16) for introduction in the conditioning container (20) for purposes of polishing and recycling of the fluid. The clean water tank (92) further provides ozonator makeup by use of booster pump (110) which draws from the clean water tank (92) placement into the conditioning container (20) wherein the clean water is injected with ozone as previously mentioned by injector (42) for storage and ozone contact tank (44).

It should be noted that the use of drilling fluid is only an example. Produced water from an oil or gas well, or even enhancement of potable water benefits from the process.

Figure 2A:
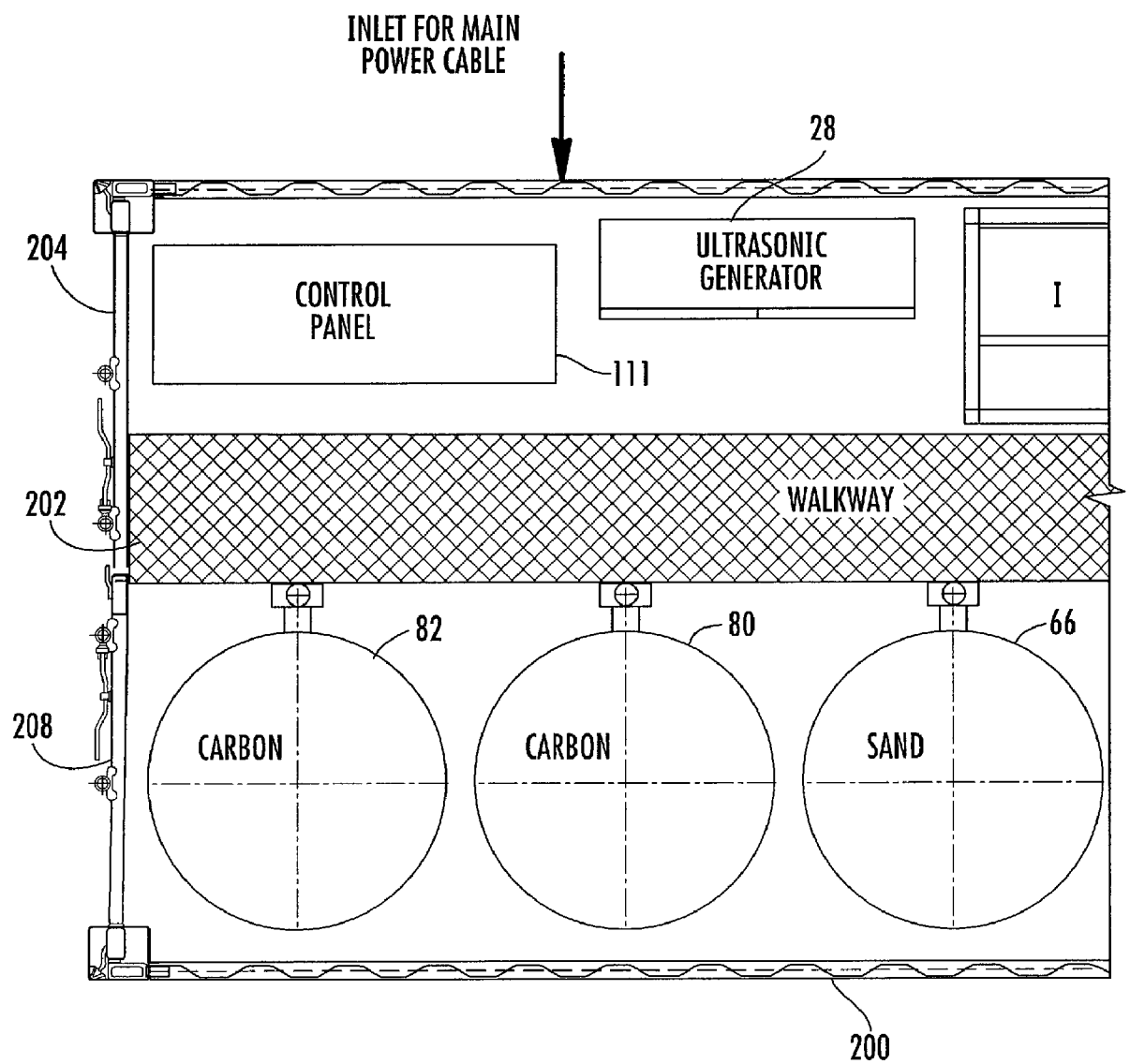
FIGS. 2A & 2B is a floor layout illustrating equipment placement within a 20 ft container.
Figure 2B:
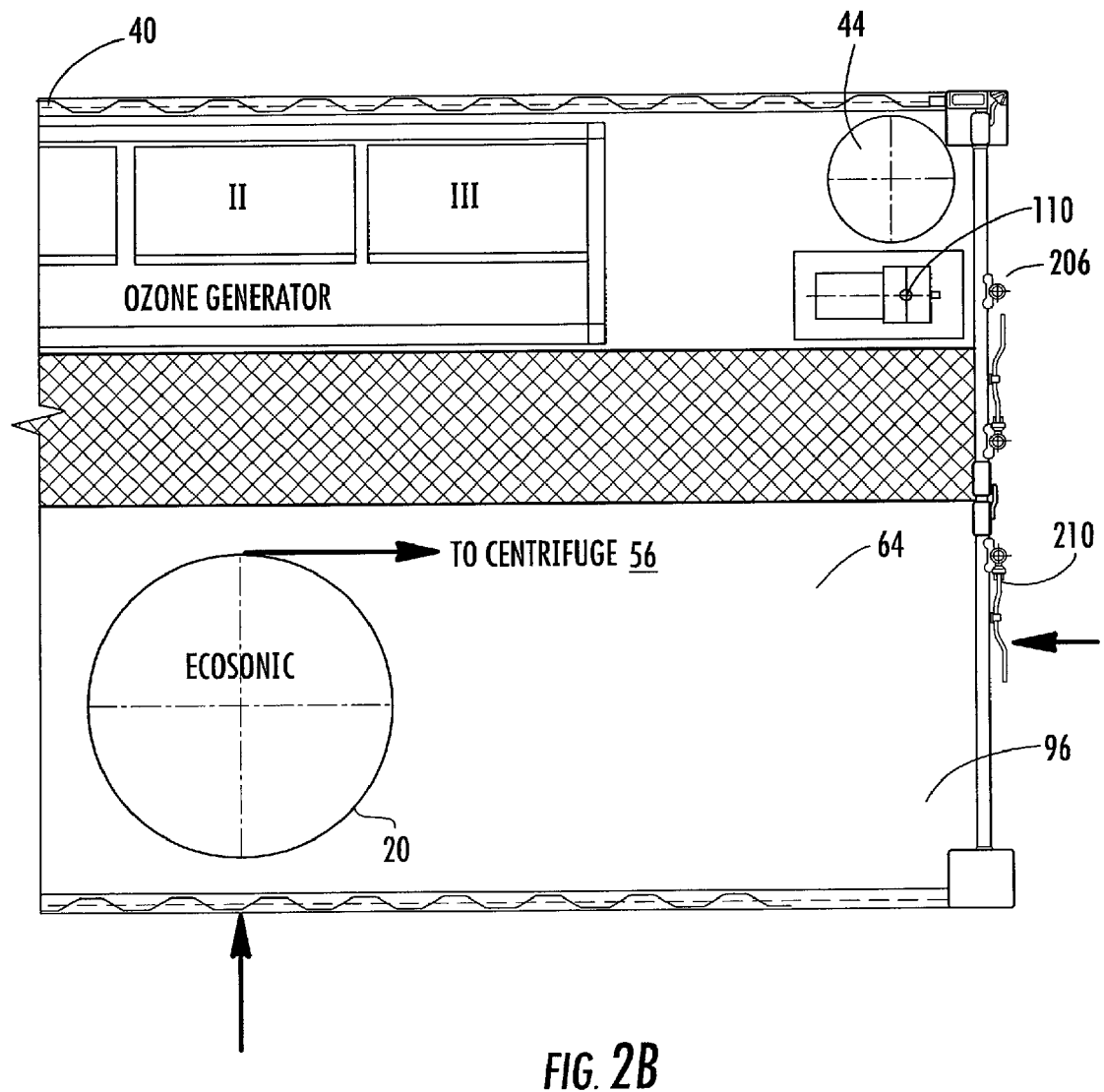

Now referring to FIG. 2 set forth is a layout of a container depicting the conditioning container (20) having the ozone contact tank (44) and booster pump (110). Following the conditioning container (20) the effluent is directed to the centrifuge (56) located outside of the container and placed in a water holding tank (62) not shown but also placed outside of the container. The water from the tank (62) is repressurized by booster pump (64) and directed through sand filter (66) followed by activated carbon filters (80) and (82). Also placed within the shipping container (200) is the ozone generator (40) and ultrasonic generator (28). A central control panel (111) allows central control operation of all components. A repressurization pump (96) can also be placed within the container (200) for use in backwashing the activated carbon and sand filter. The conventional container has access doors on either end with a walkway (202) in a central location. The walkway allows access by either door (204) or (206). Access to the activated carbon and sand filters as well as the pressurization pumps can be obtained through access doors (208) and (210).

Figure 3A:
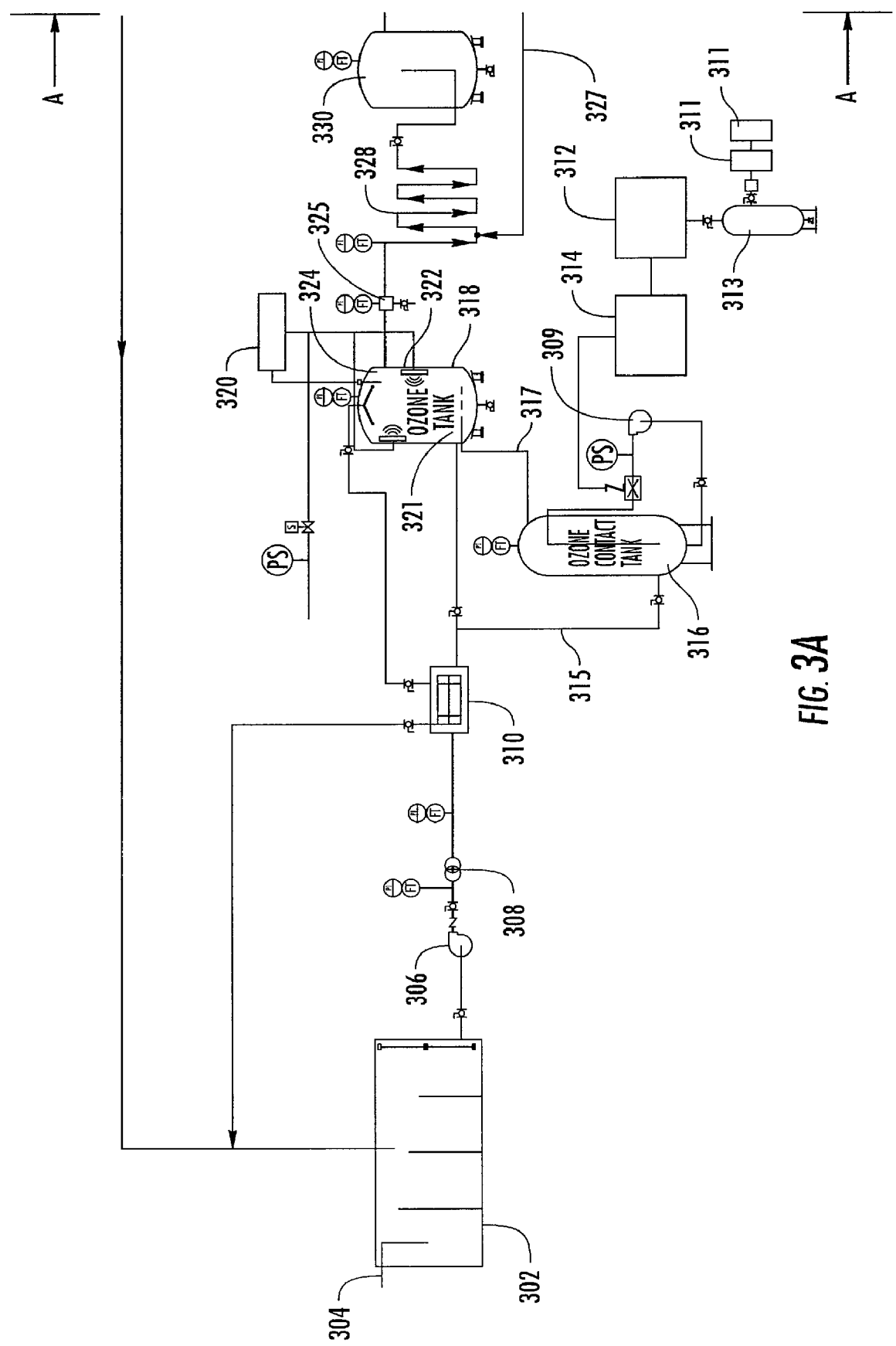
FIGS. 3A, 3B, and 3C illustrate the flow diagram for processing flowback water at the well site.
Figure 3B:
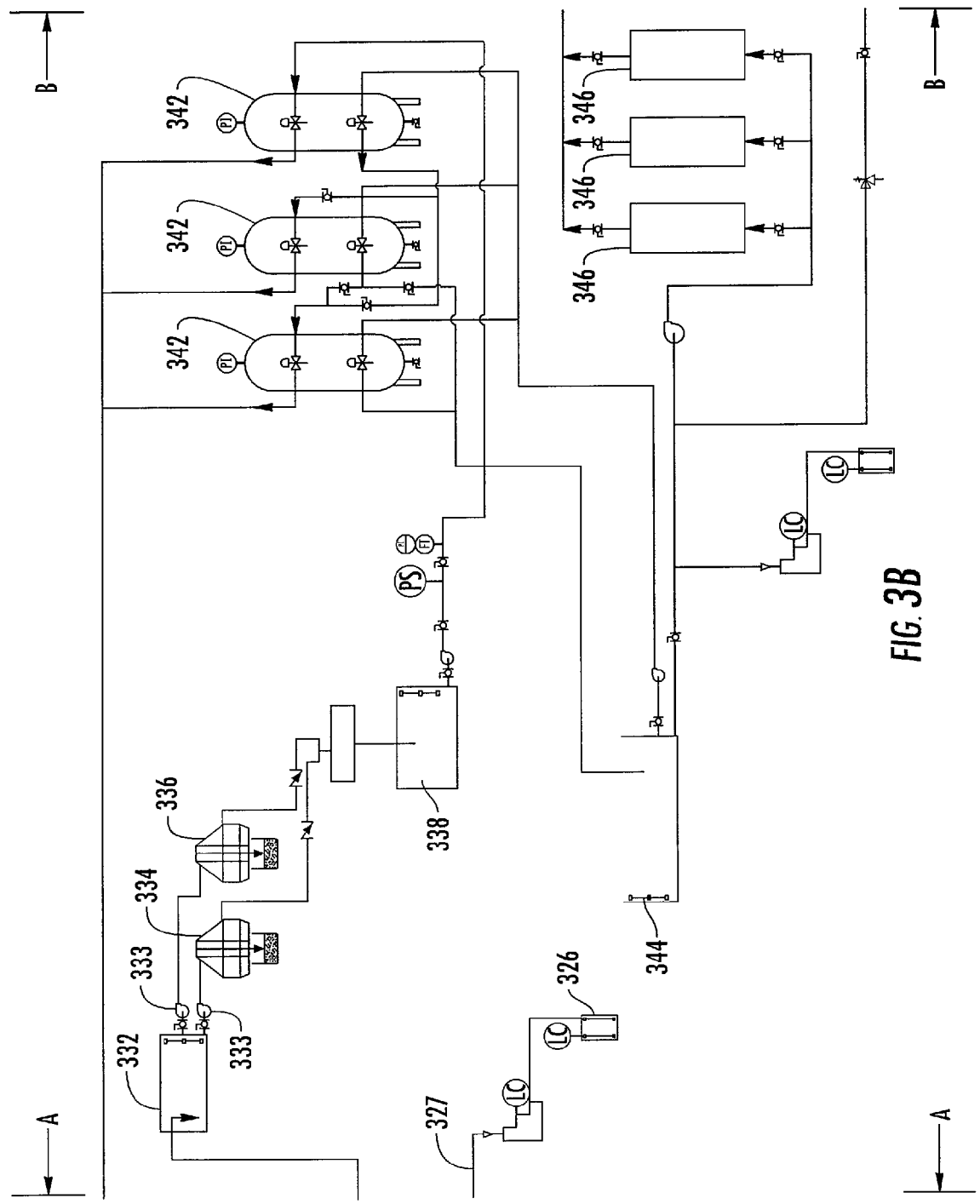
Figure 3C:
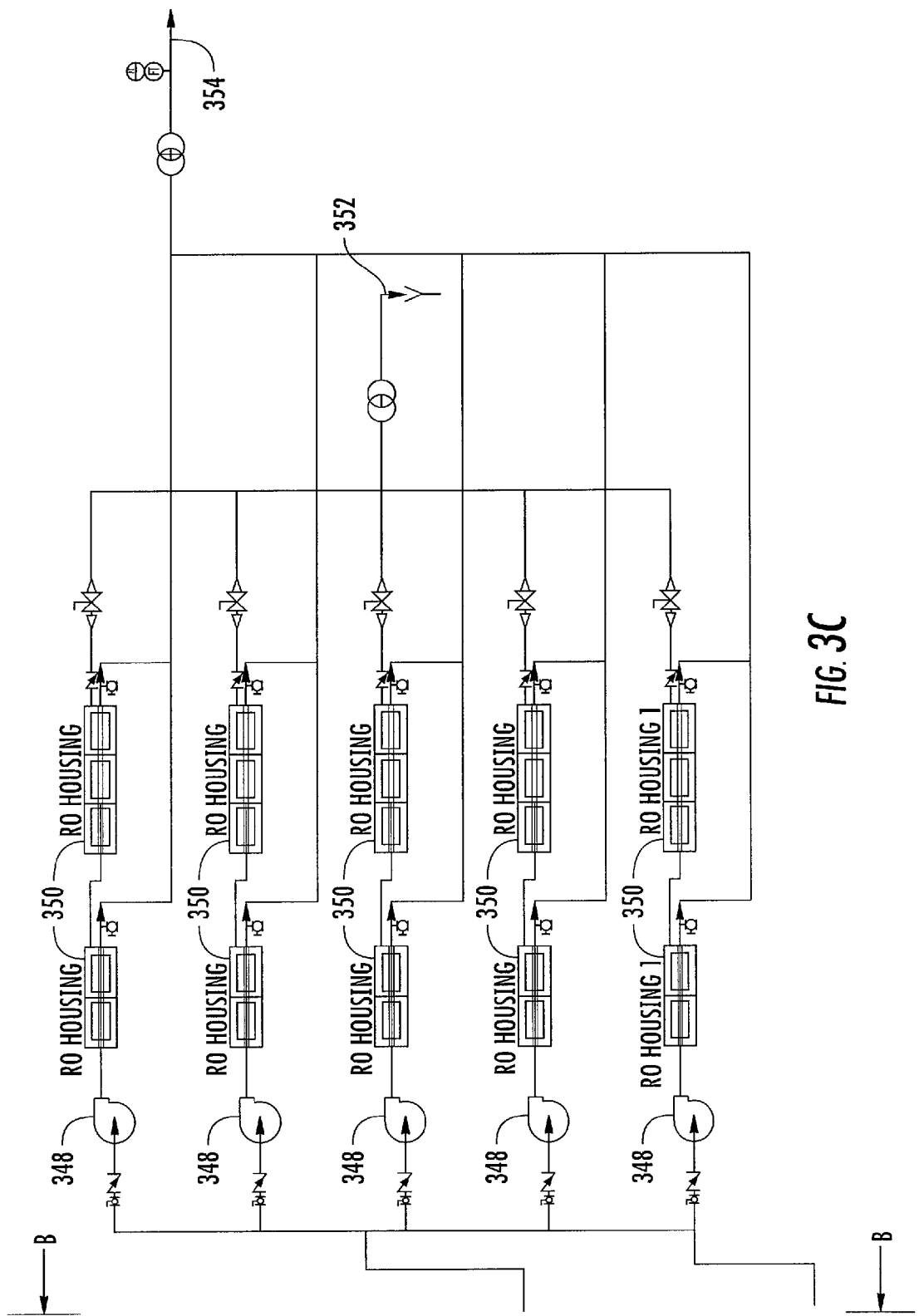

FIGS. 3A, 3B, and 3C illustrate the frac water fluid treatment process. This apparatus used in this process is designed to be mounted within a standard shipping container or truck trailer such that it can be moved from location to location to treat the frac water on site. Frac water enters frac water process tank 302 through inlet 304. The effluent is removed from tank 302 by pump 306 through flow meter 308 and then through back wash filter 310. Filter 310 removes substances such as frac sands and foreign particles in the range of 25 to 50 microns. From the filter 310, seventy percent of the effluent is saturated with ozone in ozone contact tank 316, via line 315, and the remaining thirty percent is introduced into main reactor tank 318, via line 319. Reactor tank is maintained at an internal pressure greater than atmospheric. Oxygen generator 312 feeds ozone generator 314 which in turn feeds into ozone contact tank 316. Line 317 feeds the effluent leaving ozone contact tank 316 to the main reactor tank 318. The effluent from the ozone contact tank 316 is introduced through a manifold 321 within the reactor tank 318. The manifold includes orifices designed to create hydrodynamic cavitations with the main reactor tank 318. In addition the reactor tank 318 also includes ultrasonic transducers 322 positioned as various elevations within the reactor tank 318. These ultrasonic transducers 322 are designed to create acoustic cavitations. Aluminum sulfate from tank 326 is introduced to in line mixer 328 via line 327. The effluent from pressurized main reactor tank 312 is carried by line 325 to in line 328 where it mixes with the aluminum sulfate. The effluent then flows through tanks 330 and 332 prior to entering disc bowl centrifuges 334 and 336. To remove total organic carbon from the effluent it is passed through an ultraviolet light source having a wavelength 185 nm in vessel 338. The total organic compound breaks down into CO2 in the presence of hydroxyl radical present in the effluent.

The effluent is then passed through three media tanks 342 each containing activated carbon. These filters will polish the effluent further and remove any leftover heavy metals. They will also break down any remaining ozone and convert it into oxygen. The effluent will then be conveyed to tank 344 prior to being introduced to micron filters 346. Each filter is capable of filtering material down to one to five microns. The effluent leaving the micron filters is then pressurized via pumps 348 prior to entering the reverse osmosis membranes 350. Each pump 348 can operate up to 1000 psi separating clean permeate and reject the brine. Outlet 352 carries the concentrated waste product to be conveyed to a reject water tank for reinjection or other suitable disposal. Outlet 354 carries the RO product water to be conveyed to a clean water frac tank for storage and distribution.

Figure 4A:
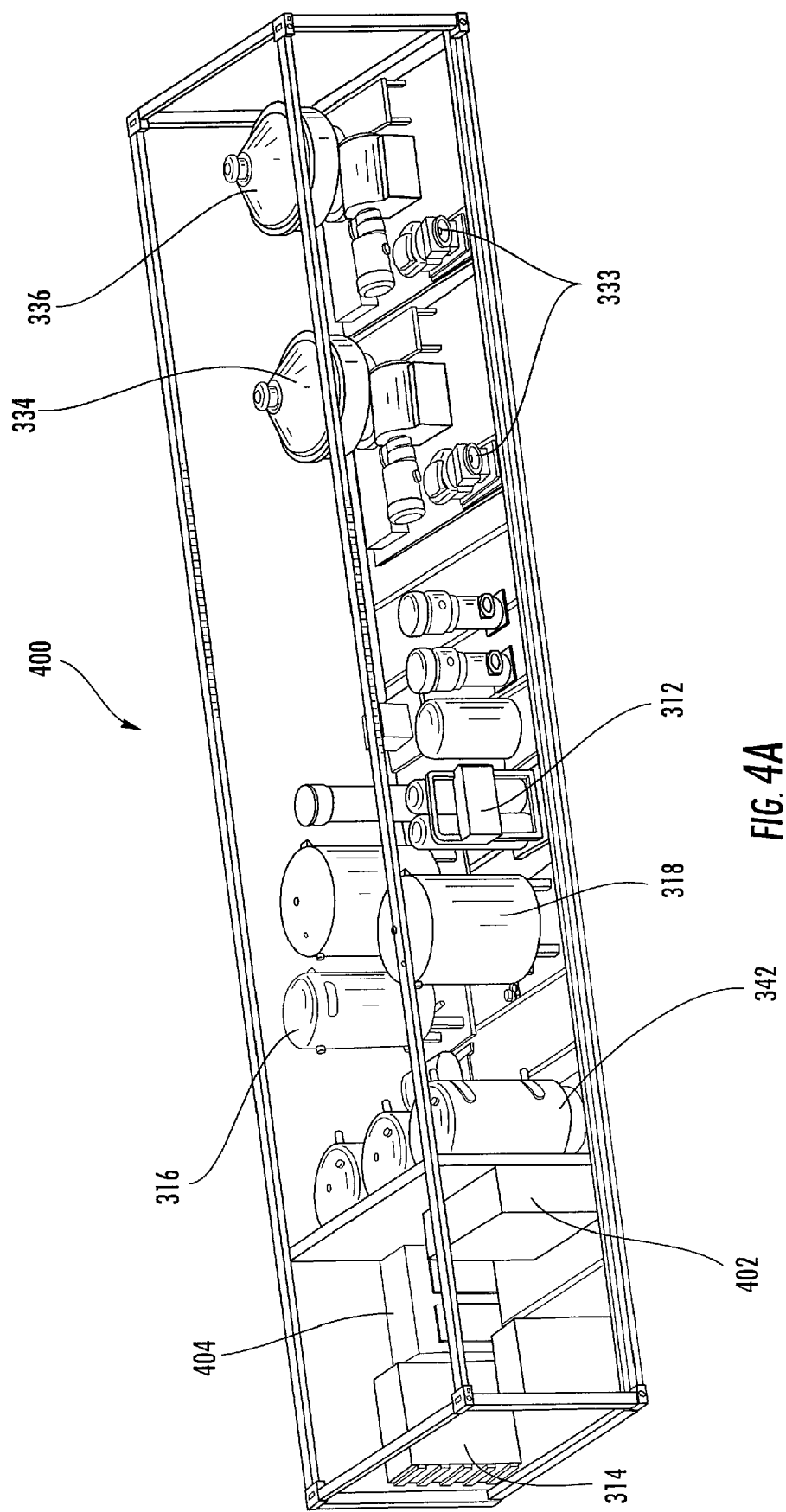
FIG. 4A is a front perspective view of the containerized apparatus for treating flowback water.

FIG. 4A is a perspective side view of the containerized frac water purification apparatus with the side walls and top removed for clarity. Container 400 is a standard container typically used to ship freight, and the like, by truck, rail or ship. Each container will be brought to the well site by truck and installed to process the flowback frac water. The container is partitioned into two separate areas. One area includes the ozone generator 314 a main control panel 402 and an ultra sonic panel 404. The other section includes the three media tanks 342, the pressurized main reactor tank 318, the air separation unit 312, centrifuge feed pumps 333 and centrifuges 334 and 336.

Figure 4B:
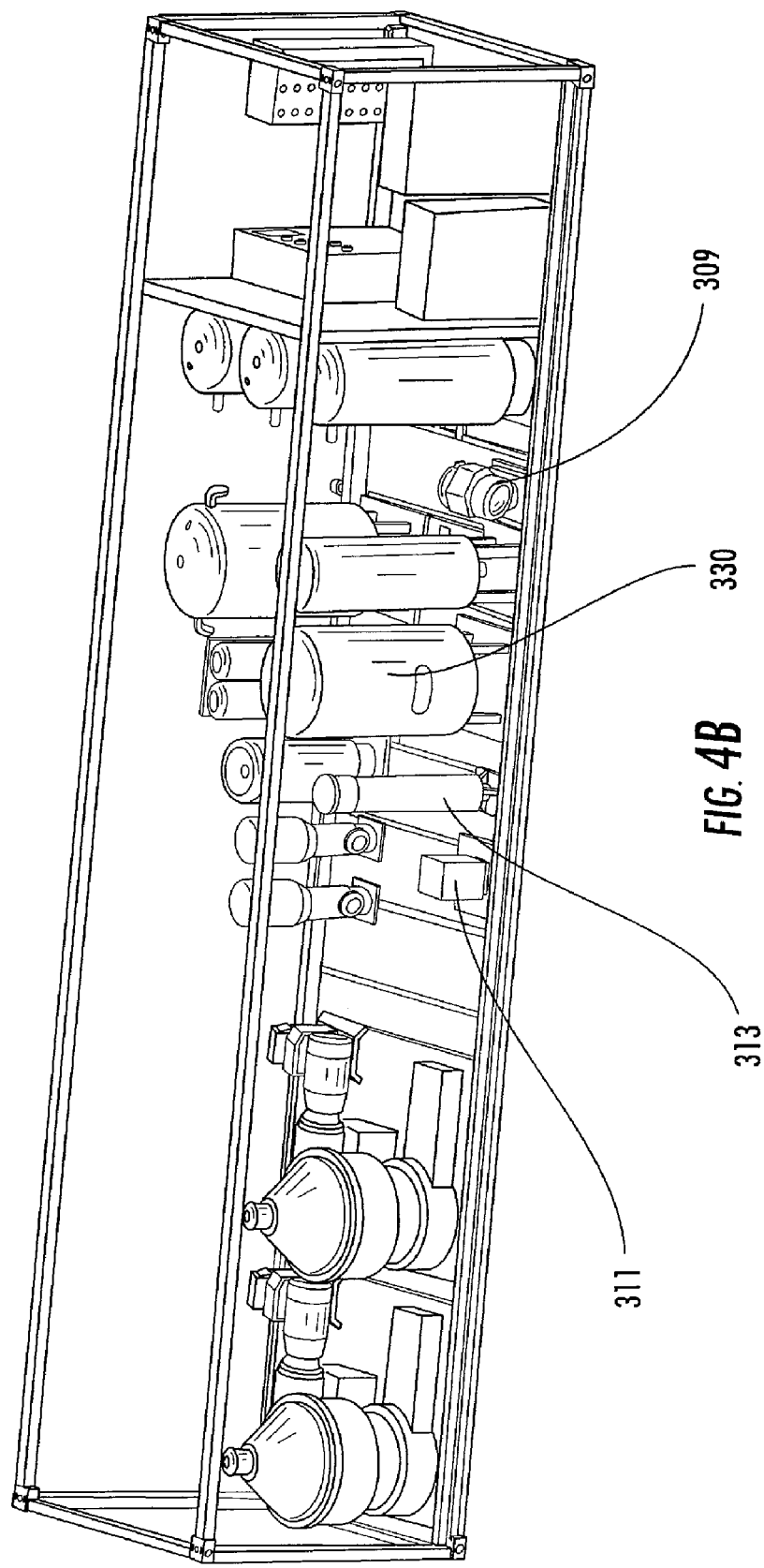
FIG. 4B is a rear perspective view of the containerized apparatus for treating flowback water.

FIG. 4B illustrates the ozone booster pump 309, the reaction tank 330, the air tank 313, the air compressor and dryer 311 and the ozone booster pump 309.

Figure 4C:
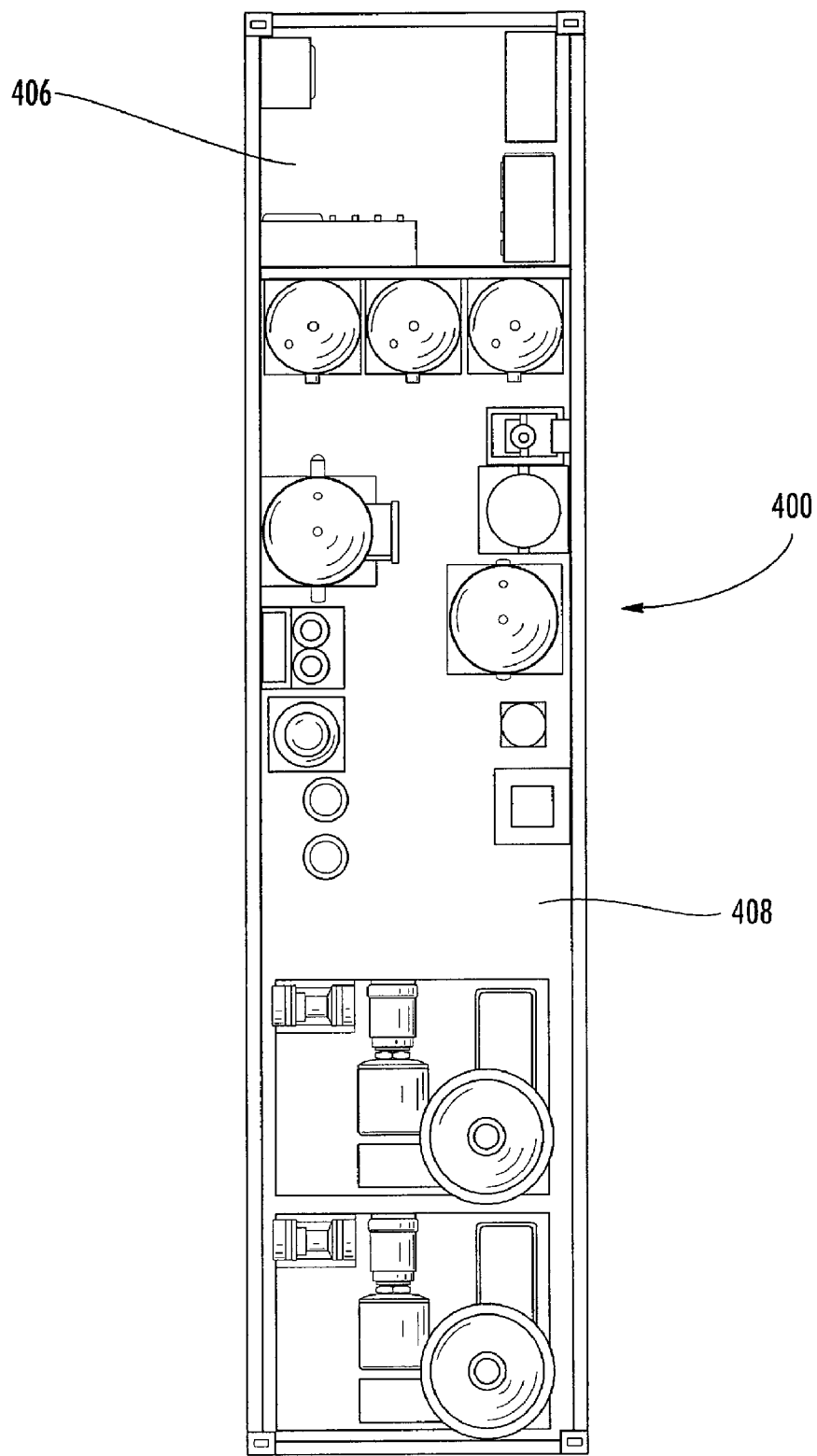
FIG. 4C is a top view of the containerized apparatus for treating flowback water.

FIG. 4C is a top view of the container 400 and shows control room 406, and equipment room 408.

Figure 5A:
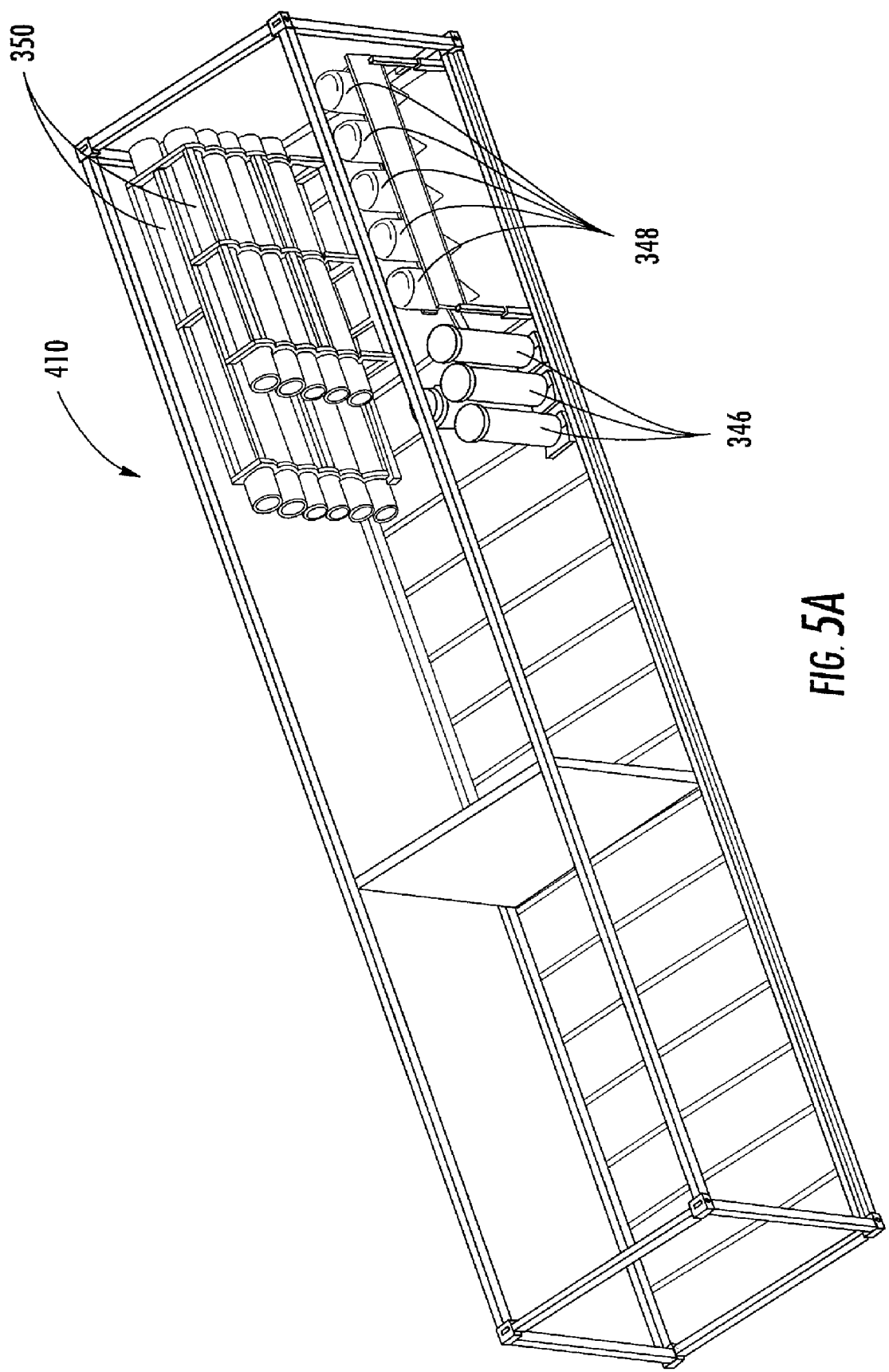
FIG. 5A is a perspective view of the containerized reverse osmosis (RO) equipment.
Figure 5B:
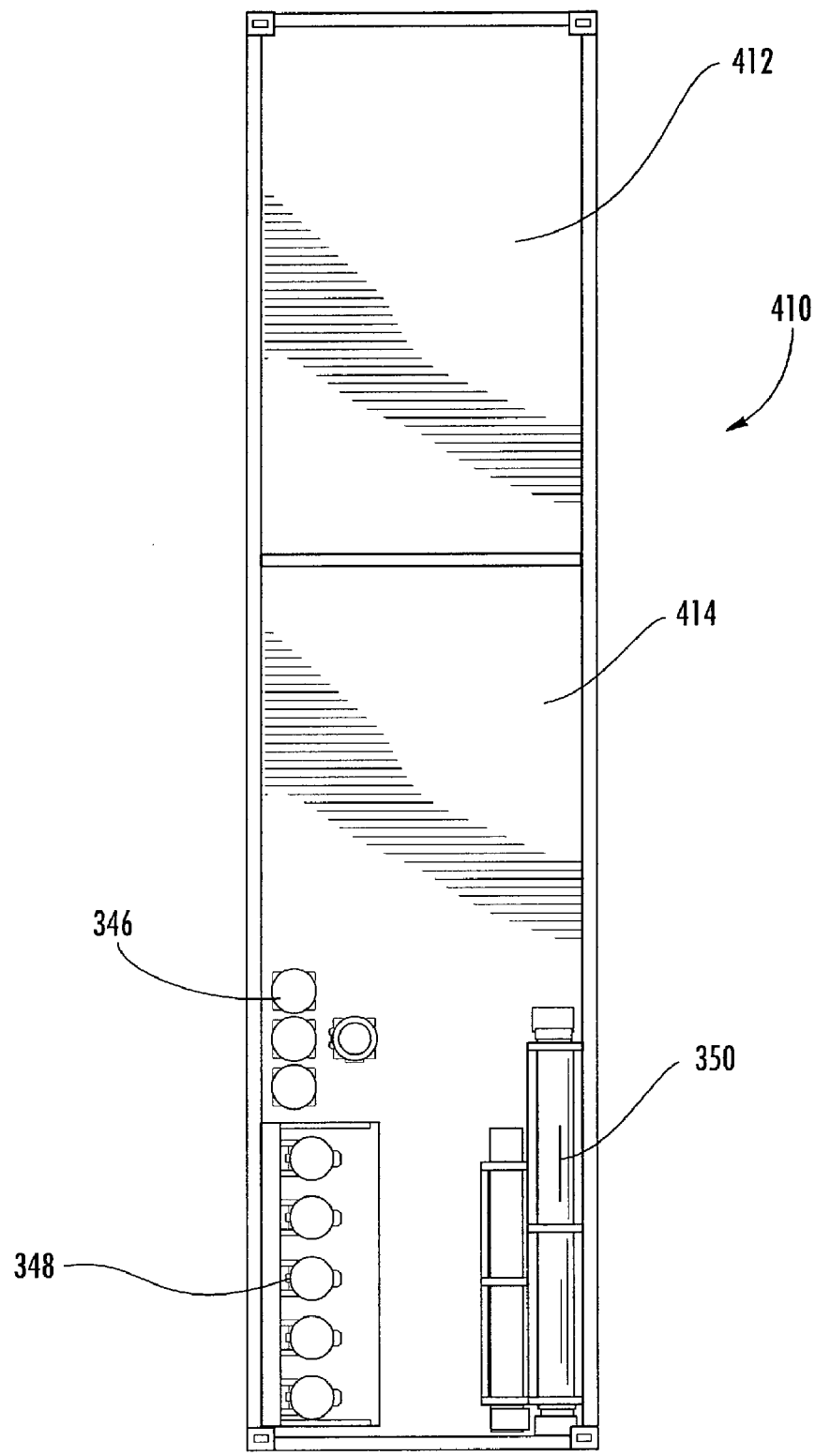
FIG. 5B is a top view of the containerized reverse osmosis (RO) equipment.

FIG. 5A shows a perspective view of a second container 410 that houses the reverse osmosis pumps 348, the micron filters 346 and osmosis membrane filters 350. FIG. 5B is a top view the second container that shows how the second container is partitioned into two separate areas; an office/store room 412 and an equipment area 414.

Figure 6A:
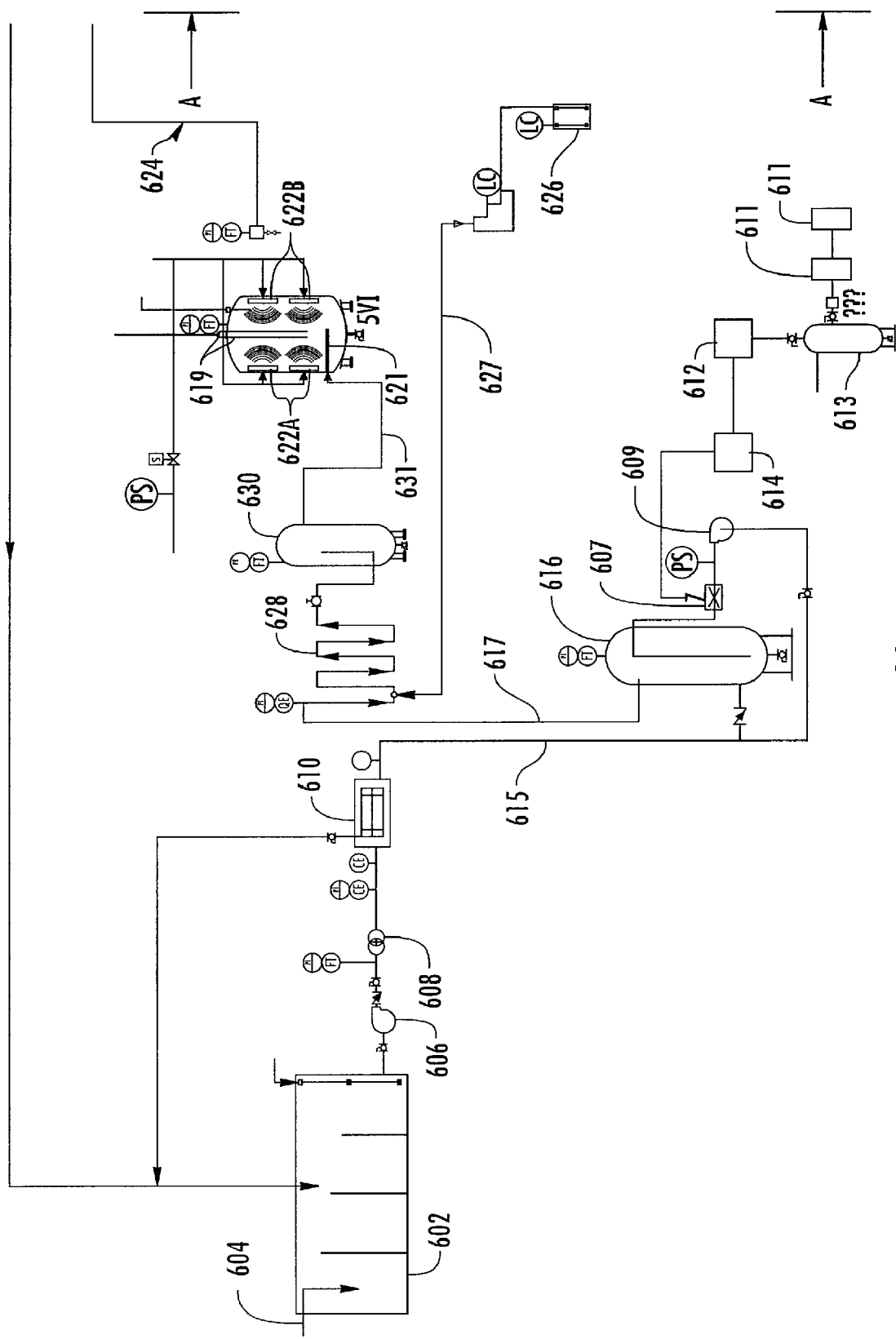
FIGS. 6A, 6B and 6C illustrate an alternative flow diagram for processing flow back water at the well site.
Figure 6B:
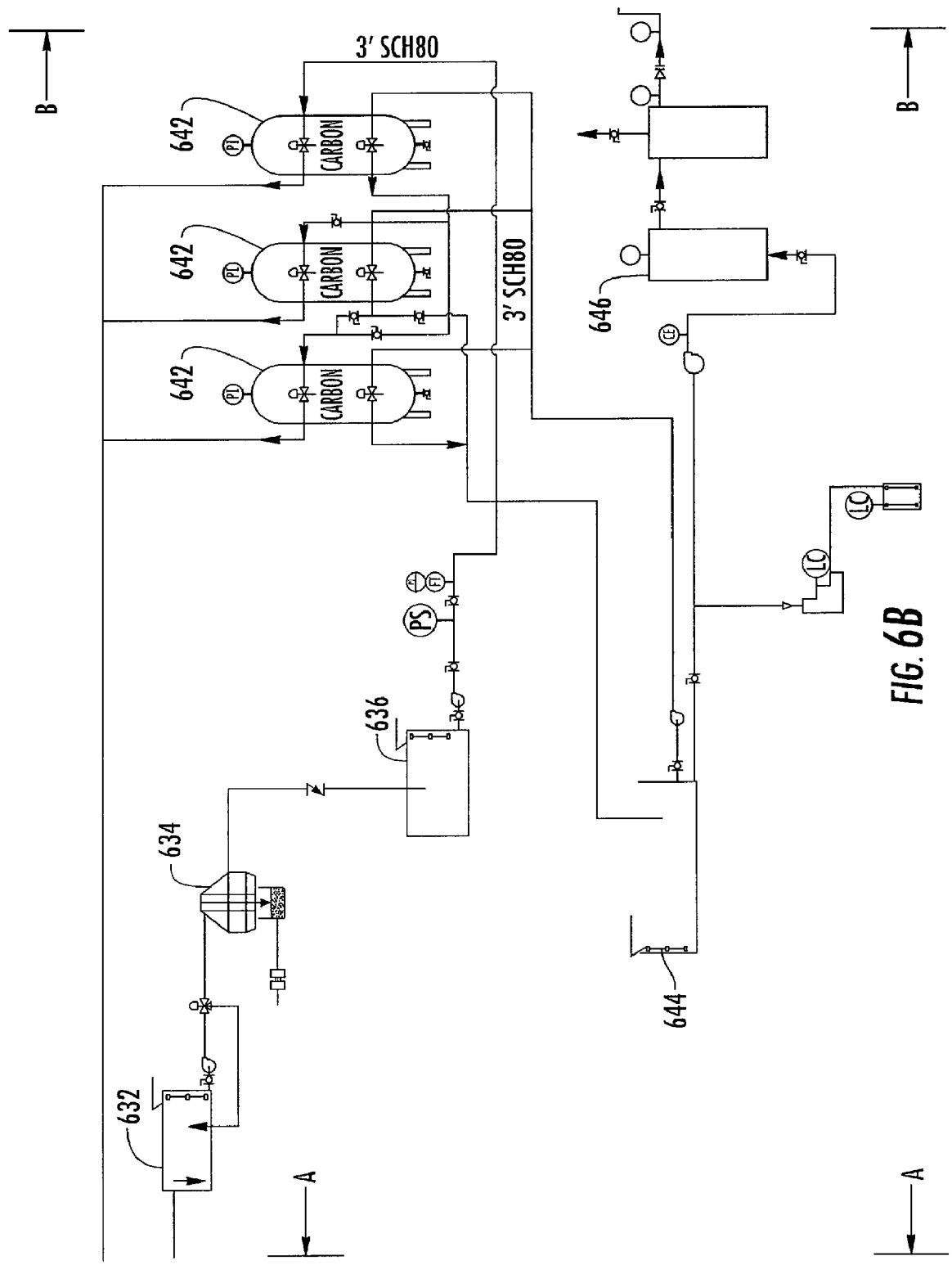
Figure 6C:
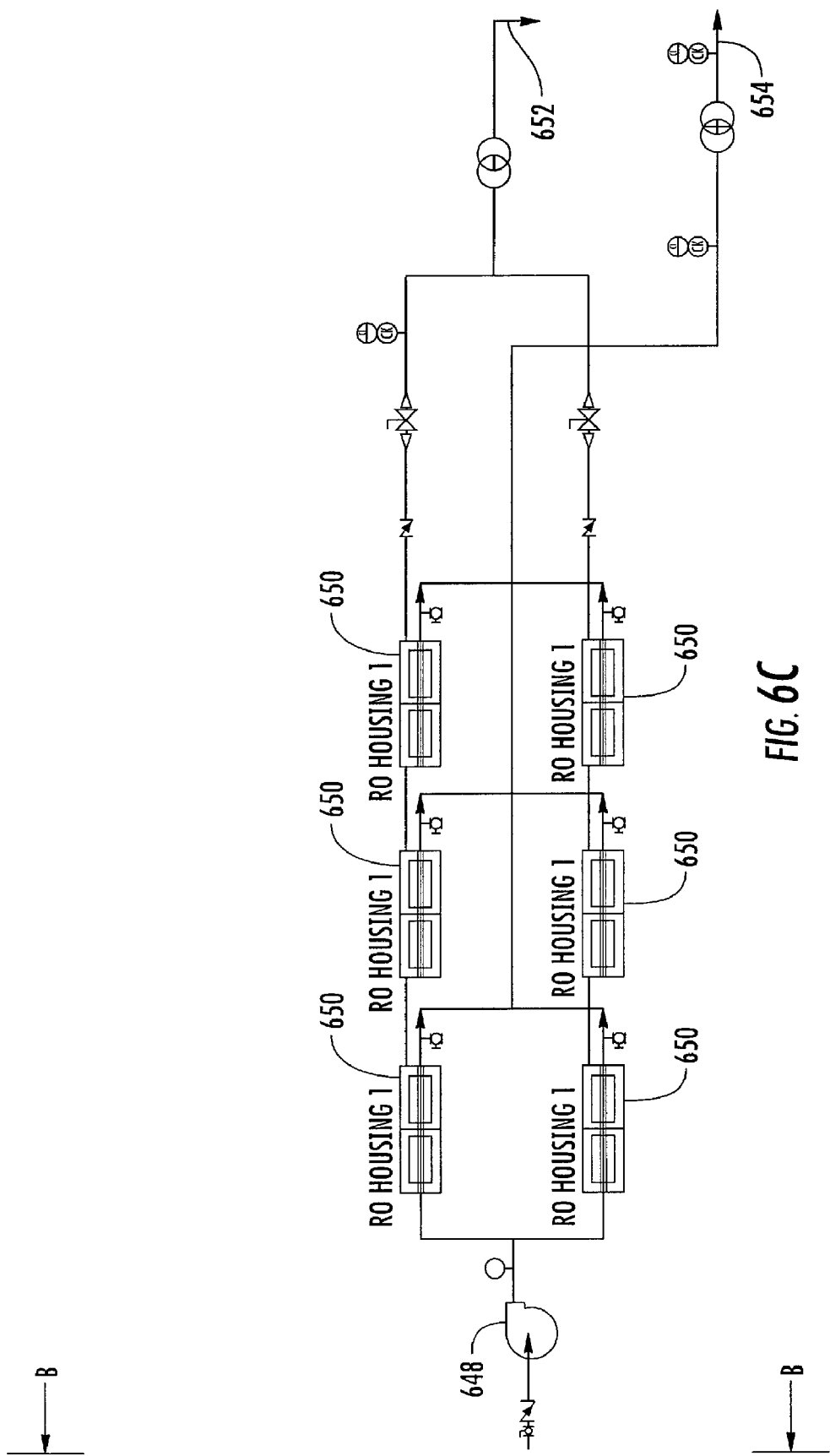

FIGS. 6A, 6B, and 6C illustrate an alternative frac water fluid treatment process. This apparatus used in this process is designed to be mounted within a truck trailer such that it can be moved from location to location to treat the frac water on site. Frac water enters frac water process tank 602 through inlet 604. The effluent is removed from tank 602 by pump 606 through flow meter 608 and then through back wash filter 610. Filter 610 removes substances such as frac sands and foreign particles in the range of 25 to 50 microns. From the filter 610 the effluent proceeds via line 615 to ozone treatment tank 616 where it is saturated with ozone. Air enters compressor 613 through dryers 611. Oxygen generator 612 receives compressed air from compressor 613 and feeds ozone generator 614 which in turn feeds ozone to a high efficiency, venturi type, differential pressure injector 607 which mixes the ozone gas with the flowback water. The flowback water enters the injector at a first inlet and the passageway within the injector tapers in diameter and becomes constricted at an injection zone located adjacent the second inlet. At this point the flowback flow changes into a higher velocity jet stream. The increase in velocity through the injection zone results in a decrease in pressure thereby enabling the ozone to be drawn in through the second inlet and entrained into the flowback water. The flow path down stream of the injection zone is tapered outwards towards the injector outlet thereby reducing the velocity of the flowback water. Within injector 607 ozone is injected through a venturi at vacuum of 5 inches of Hg. The pressure drop across the venturi is approximately 60 psi which ensures good mixing of the ozone gas with the effluent and small ozone bubble generation. An ozone booster pump 609 feeds effluent and ozone into injector 607. Line 617 then conveys the output of ozone treatment tank 616 to an in line static mixer 628. The inline static mixture 628 ensures that the bubbles are maintained at the 1 to 2 micron level. Aluminum sulfate from tank 626 is introduced to in line static mixer 628 via line 627. The inline static mixer 628 is comprised of a series of geometric mixing elements fixed within a pipe which uses the energy of the flow stream to create mixing between two or more fluids. The output of in line mixer 628 is then introduced into chemical mixing tank 630. The alum is a coagulating agent with a low pH that coagulates suspended solids and also keeps iron in suspension. The output of mixing tank 630 is then conveyed via line 631 to main reactor tank 618. The output is introduced through a manifold 621 within the main reactor tank 618.

Figure 7:
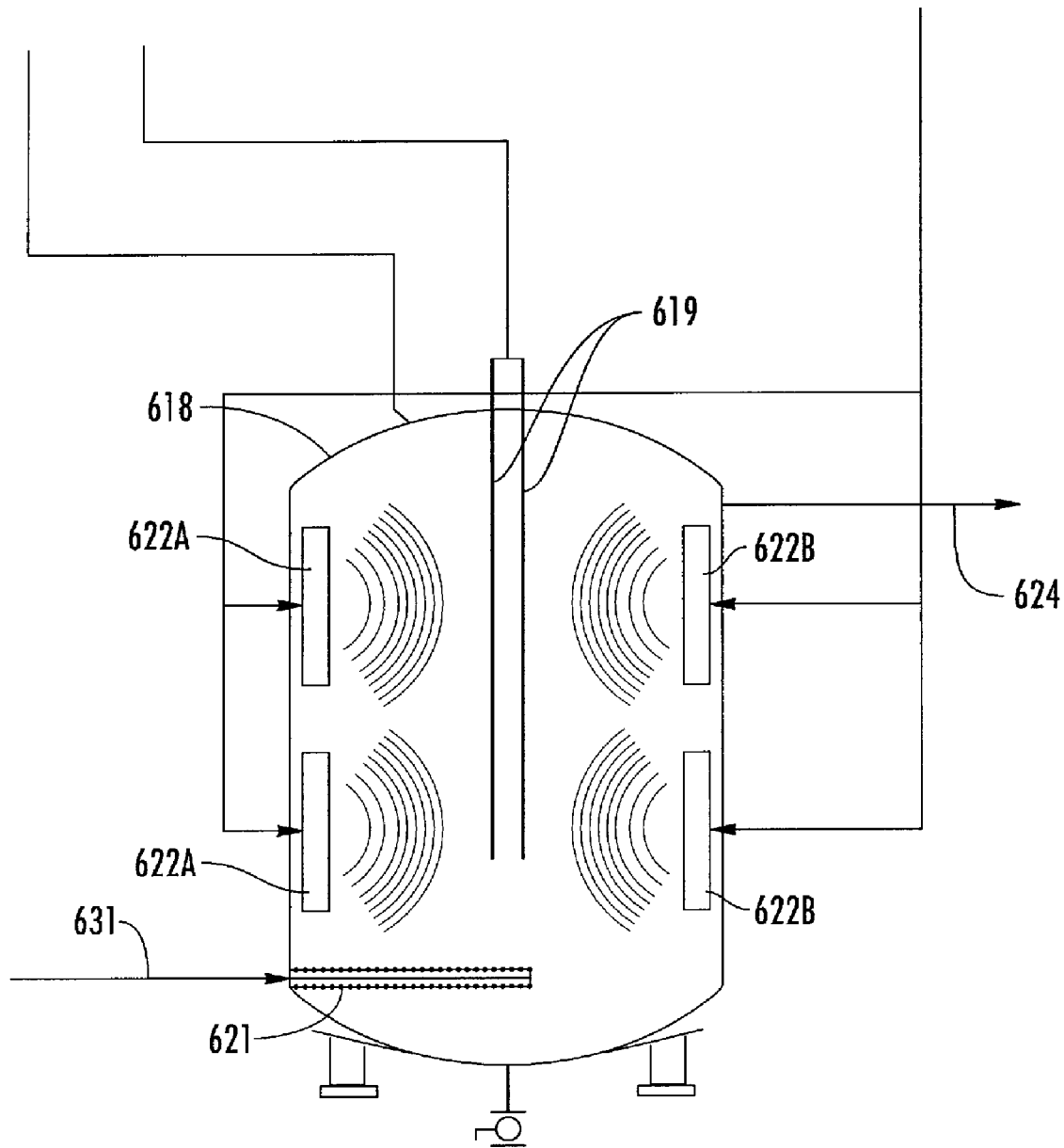
FIG. 7 illustrates the reactor tank used in the flow processing shown in FIGS. 6a through 6C.

The manifold 621 includes orifices designed to create hydrodynamic cavitations with the main reactor tank 618. By way of example, the diameters of the holes within the manifold 621 are approximately 5 mm and the pressure difference across the manifold is approximately 20 psi. In addition, the main reactor tank 618 also includes four submersible ultrasonic transducers 622A and 622B positioned at various elevations within the reactor tank 618. These ultrasonic transducers 622A and 622B are designed to create acoustic cavitations. Each transducer includes a diaphragm that is balanced with the help of a pressure compensation system so that a maximum amount of ultrasonic energy is released into the effluent. The main reactor tank 618 includes a pair of 16 KHz and a pair of 20 KHz frequency ultrasonic horns (622A and 622B, respectively). The ultrasonic horns 622A and 622B are installed around the periphery of the tank creating a uniform ultrasonic environment which helps to increase the mass transfer efficiency of the ozone. In addition, the 16 KHz and 20 KHZ horns 622A and 622B are installed opposite to each other inside the tank to create a dual frequency filed that continuously cleans the internal tank surface. The acoustic cavitations generated by the ultrasonic generators 622A and 622B also greatly enhance the oxidation rate of the organic material with ozone bubbles and ensure uniform mixing of the oxidant with the effluent. As shown in FIGS. 6A and 7 main reactor tank 618 also includes a plurality of anodes 619 within the tank that provides DC current to the effluent and thereby creates oxidants in the water. In this process the DC current drives the electro precipitation reaction for the hardness ions present in the effluent. During this treatment the positively charged cations move towards the electron emitting (negative) cathode which is the shell of the main reactor tank 618. The negatively charged anions move towards the positive anodes 619. In this process sulfate ions are fed to the cations which either form a scale or are transformed into a colloidal from and remain suspended in the effluent. Some heavy metals are oxidized to an insoluble dust while others combine with sulfate or carbonate ion to make a precipitate under the influence of the electrode. The carbonate and sulfate salt precipitate on the return cathode surface. The ultrasound continuously cleans the precipitation on the return cathode surface and produces small flakes which are removed later in the process during centrifuge separation. The cations which precipitate with sulfate ions are in colloidal form have fewer tendencies to form any scaling and remain in colloidal form through out the process notwithstanding the temperature and pressure. The coagulated suspended solids are then removed in centrifuge separation later in the process. The anodes 619 are made of titanium and are provided with a coating of oxides of Rh and Ir to increase longevity. The anodes 619 are powered by a DC power supply whose power output can be up to 100 volts DC and up to 1000 amps current. The DC power supply can be varied according to targeted effluent. For example, for water effluent with a higher salt content the power supply output would provide less DC voltage and more DC current than water with low levels of salt. The main Reactor tank 618 is maintained at an internal pressure greater than atmospheric.

The effluent then flows through line 624 and into tank 632 and then through feed pump 633 into centrifuge 634 and then into intermediate process tank 636.

The effluent is then passed through three media tanks 642 each containing activated carbon. These filters will polish the effluent further and remove any leftover heavy metals. They will also break down any remaining ozone and convert it into oxygen. The effluent will then be conveyed to tank 644 prior to being introduced to micron filter 646. The filter is capable of filtering material down to one to five microns. The effluent leaving the micron filter passes through an accumulator and is then pressurized via pump 648 prior to entering the reverse osmosis membranes 650. The pump 648 can operate up to 1000 psi separating clean permeate and reject the brine. Outlet 652 carries the concentrated waste product to be conveyed to a reject water tank for reinjection or other suitable disposal. Outlet 654 carries the RO product water to be conveyed to a clean water frac tank for storage and distribution.

Figure 8:
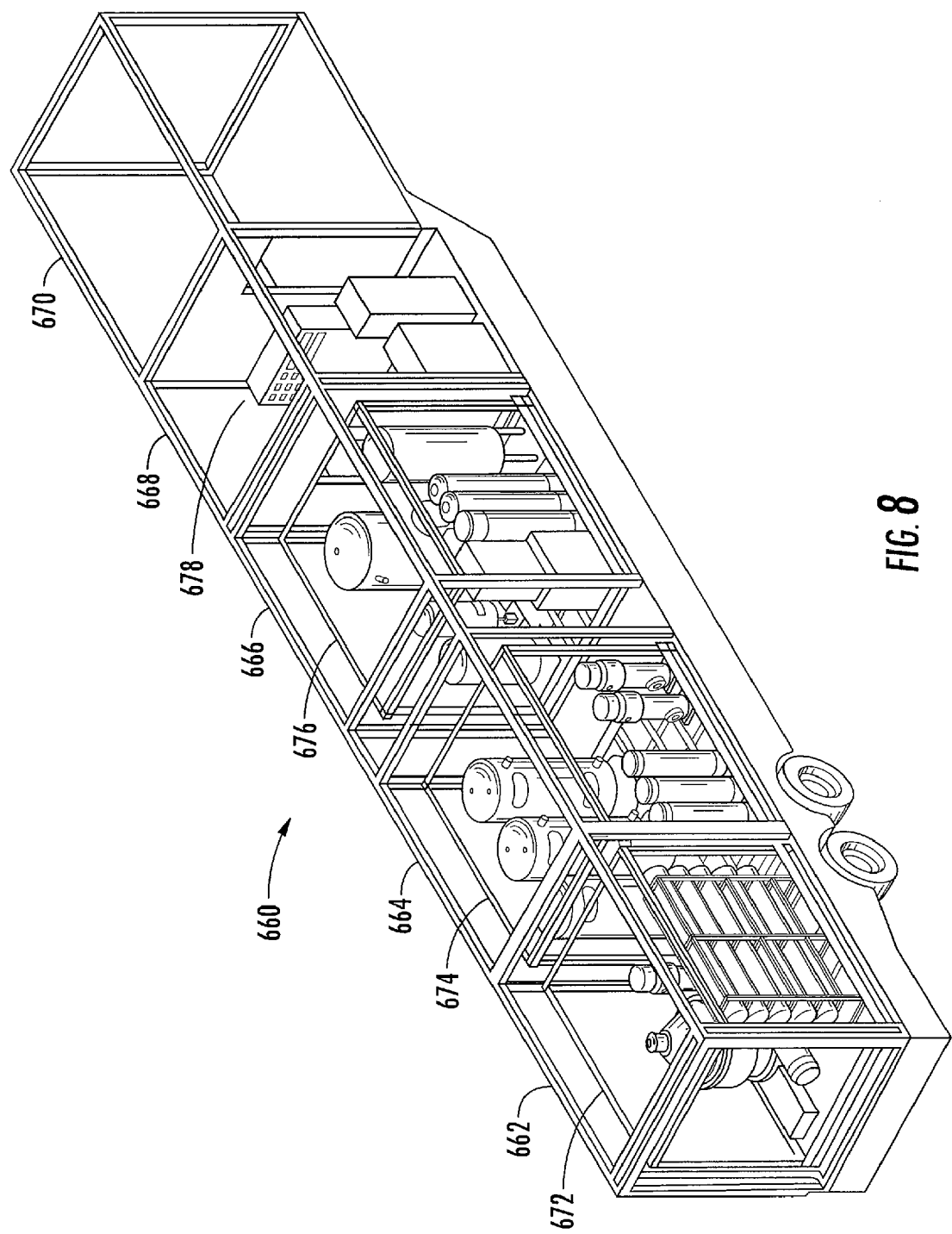
FIG. 8 is a cutaway perspective view of a truck trailer containing the equipment necessary for processing the flow back water at the well site.

FIG. 8 illustrates a cut away view of a modified truck trailer 660 that is designed to transport the frac water processing equipment for the system such as the one disclosed in FIGS. 6A-6C. The trailer is partitioned into discrete areas. As shown, area 662 is designated as the area for the RO equipment and the centrifuge. Area 664 is the area designated for the media and cartridge filters. Similarly, area 666 would contain the ozone producing and treatment equipment as well as the main treatment tank. The control room is installed in compartment 668 and an electrical generator (typically 280

Kw) is installed in compartment 670. The equipment is assembled in a modular fashion. Module 672 includes a centrifuge and RO and ancillary equipment mounted on a skid. Module 674 includes the media and cartridge filters and ancillary equipment that is also mounted on a skid. A third module 676 includes the ozone producing and treatment equipment, the main treatment tank and other supporting equipment also mounted on a moveable skid. By configuring the processing equipment in a modular fashion and placing them on skids that are removable from the truck trailer the system components can be readily replaced. The ability to swap out system component modules substantially minimizes system down time and improves the ability to repair the processing equipment in a quick and efficient manner.

FIG. 9 shows data tables representing two samples of flow back water. Each data table sets forth the contaminants within the flow back water prior to treatment in the main reaction tank as compared to the same contaminants subsequent to treatment in the main reaction tank. As can be seen from the tables, the main treatment tank will remove substantial amounts of contaminant from the flow back water.

The theory of operation behind the main treatment is a s follows. The mass transfer of ozone in the flow back water is achieved by hydrodynamic and acoustic cavitations. In the pressurized tank the ozonated flow back water is mixed with incoming flow back water by a header having many small orifices. The phenomenon of hydrodynamic cavitations is created as the pressurized flow back water leaves the small orifices on the header. The dissolved ozone forms into millions of micro bubbles which are mixed and reacted with the incoming flow back water. As the flow back water flows upwards through the reaction tank ultrasonic transducers located around the periphery of the tank at different locations emit 16 KHz and 20 KHz waves in the flow back water.

A sonoluminescence effect is observed due to acoustic cavitation as these ultrasonic waves propagate in the flow back water and catch the micro bubbles in the valley of the wave. Sonoluminescence occurs whenever a sound wave of sufficient intensity induces a gaseous cavity within a liquid to quickly collapse. This cavity may take the form of a pre-existing bubble, or may be generated through hydrodynamic and acoustic cavitation. Sonoluminescence can be made to be stable, so that a single bubble will expand and collapse over and over again in a periodic fashion, emitting a burst of light each time it collapses. A standing acoustic wave is set up within a liquid by four acoustic transducers and the bubble will sit at a pressure anti node of the standing wave. The frequencies of resonance depend on the shape and size of the container in which the bubble is contained. The light flashes from the bubbles are extremely short, between 35 and few hundred picoseconds long, with peak intensities of the order of 1-10 mW. The bubbles are very small when they emit light, about 1 micrometer in diameter depending on the ambient fluid, such as water, and the gas content of the bubble. Single bubble sonoluminescence pulses can have very stable periods and positions. In fact, the frequency of light flashes can be more stable than the rated frequency stability of the oscillator making the sound waves driving them. However, the stability analysis of the bubble shows that the bubble itself undergoes significant geometric instabilities, due to, for example, the Bjerknes forces and the Rayleigh-Taylor instabilities. The wavelength of emitted light is very short; the spectrum can reach into the ultraviolet. Light of shorter wavelength has higher energy, and the measured spectrum of emitted light seems to indicate a temperature in the bubble of at least 20,000 Kelvin, up to a possible temperature in excess of one mega Kelvin. The veracity of these estimates is hindered by the fact that water, for example, absorbs nearly all wavelengths below 200 nm. This has led to differing estimates on the temperature in the bubble, since they are extrapolated from the emission spectra taken during collapse, or estimated using a modified Rayleigh-Plesset equation. During bubble collapse, the inertia of the surrounding water causes high speed and high pressure, reaching around 10,000 K in the interior of the bubble, causing ionization of a small fraction of the noble gas present. The amount ionized is small enough fir the bubble to remain transparent, allowing volume emission; surface emission would produce more intense light of longer duration, dependent on wavelength, contradicting experimental results. Electrons from ionized atoms interact mainly with neutral atoms causing thermal bremsstrahlung radiation. As the ultrasonic waves hit a low energy trough, the pressure drops, allowing electrons to recombine with atoms, and light emission to cease due to this lack of free electrons. This makes for a 160 picosecond light pulse for argon, as even a small drop in temperature causes a large drop in ionization, due to the large ionization energy relative to the photon energy.

By way of example, the instant invention can be used to treat produced water containing water soluble organic compounds, suspended oil droplets and suspended solids with high concentration of ozone and ultrasonic waves resulting in degrading the level of contaminants.

Case 1: Processing Fluid (Effluent) from Oil Drilling Well

Objective: To increase the efficiency of mechanical centrifugal Separation by treating effluent generated from oil drilling operation with Ozone and Ultrasonic waves.

The main constituent of effluent is bentonite. Bentonite consists predominantly of smectite minerals montmorillonite. Smectite are clay minerals of size less than 2~5 microns. Mainly traces of silicon (Si), aluminum (Al), Magnesium (Mg), calcium (Ca) salts found in the bentonite.

The percentage of solids (bentonite) in effluent varies from 40% to 60%. Also contaminants oil, grease, VOC are found in the effluent.

Anticipated Effect of Ozone and Ultrasonic on Effluent:

Ozone 40 is introduced into the tank 20 in the form of micro bubbles which starts oxidation reactions where the organic molecules in the effluent are modified and re-arranged. The bonding between bentonite molecules with water is broken down by hydrodynamic cavitations caused by imploding micro bubbles of ozone with bentonite.

The mass transfer of ozone into effluent is further enhanced by subjecting the effluent with ultrasonic submersible transducers 24 and 26 located at various elevations in the tank. The ultrasonic wave (range from 14 KHz to 20 KHz) propagates through water causing acoustic cavitations. This helps ozone to react with bentonite irrespective of temperature and pH, coverts into collided slimy sludge mass, suspended in water.

The oxidation process of ozone improves color of the water from grey to white. During the process soluble organic compounds broke down into carbon dioxide and oxygen molecules.

As water travels from bottom 22 to the top 23 of the tank 20, volatile organic compounds are collected at the top of the tank, which can be drained out with the help of outlet 50 provided.

Main effluent is piped 48 to centrifuge where the efficiency of separation is expected to increase by 30-40%.

Case II: Produced Water from Offshore Drilling Well

Main properties of this effluent is

Color/Appearance: Black.

Total suspended solids: 9500 ppm

Total dissolved solids: 3290 ppm

Chemical Oxygen demand: 3370 ppm

Biological Oxygen Demand: 580 ppm pH: 7.88

Oil and Grease: 17.2 mgHX/1

The effluent2 has peculiar H2S odor.

Effect of Ozone and Ultrasonic Waves:

Ozone 40 is introduced into the tank 20 in the form of micro bubbles which starts oxidation reactions where the organic molecules in the effluent are modified and re-arranged. The suspended solids are separated and are broken down by hydrodynamic cavitations caused by imploding micro bubbles of ozone. This helps suspended solids coagulate. The oxidation process of ozone improves the color, eliminate the odder and convert suspended solids into inert particle.

The mass transfer of ozone into effluent is further enhanced by subjecting the effluent with ultrasonic submersible transducers 24 & 26 located at various elevations in the tank. Greater mass transfer of ozone into effluent is achieved irrespective of temperature or pH of water. The ultrasonic wave (range from 14 KHz to 20 KHz) propagates through water causing acoustic cavitations. This helps ozone to react better separating volatile organic compounds, suspended solids from water molecule. During the process soluble organic compounds broke down into carbon dioxide and oxygen molecules.

The expected results after Ozonix® Process on effluent 2 are:

Color/Appearance: pale yellow, colorless

Total suspended solids: less than 40 ppm

Total dissolved solids: less than 30 ppm

Chemical Oxygen demand: less than 10 ppm

Biological Oxygen Demand: less than 10 ppm pH: 7

Oil and Grease: less than 5 ppm

Odorless.

Case III: Treatment of Flowback or Frac Water with Mobile Equipment

The typical flowback fluid contains the following contaminants:

| | |
|---|---|
| Iron | 60.2 mg/L |
| Manganese | 1.85 mg/L |
| Potassium | 153.0 mg/L |
| Sodium | 7200 mg/L |
| Turbidity | 599 NTU |
| Barium | 14.2 mg/L |
| Silica | 36.9 mg/L |
| Stontium | 185 mg/L |
| Nitrate | 0.0100 U mg/L |
| Nitrite | 0.0200 U mg/L |
| TSS | 346 mg/L |
| TDS | 33800 mg/L |
| Oil + Grease (HEM) | 9.56 mgHx/L |
| Calcium Hardness | 4690 mg/L |
| Magnesium Hardness | 967 mg/L |
| Specific Conductance | 51500 umhos/cm |

| -continued | |
|---|---|
| Ammonia (as N) | |
| Unionized | 67.8 mg/L |
| Chloride | 19300 mg/L |
| Sulfate | 65.0 mg/L |
| Total Phosphorous (as P) | 2.07 mg/L |
| TOC | 163 mg/L |
| Bicarbonate CaCO3 | 404 mg/L |
| Bicarbonate HCO3 | 247 mg/L |
| Carbonate CO3 | 0.100 U mg/L |
| Carbonate CaCOS | 0.100 U mg/L |

All of the contaminants are eliminated at various stages of the filtration system.

During the pretreatment stage the frac, flowback water, is pumped through 50 micron filter 310 which includes an automatic backwash feature. This filter removes substances like frac sands, and foreign particles above 50 microns in size. Approximately 70 percent of the frac water is then saturated with ozone in the ozone contact tank 316 with the remainder, approximately 30 percent, directed to the main reactor tank 318. The effluent from the ozone contact tank 316 is introduced through a manifold 321 within the reactor tank 318. The manifold includes orifices designed to create hydrodynamic cavitations with the main reactor tank. In addition the reactor tank 318 also includes ultrasonic transducers 322 positioned as various elevations within the reactor tank 318. These ultrasonic transducers 322 are designed to create acoustic cavitations. The combination of both acoustical and ultrasonic cavitations causes the maximum mass transfer of ozone within the treatment tank in the shortest period of time. This process oxidizes all the heavy metals and soluble organics and disinfects the effluent. The process within the main reactor tank 318 also causes the suspended solid to coagulate thereby facilitating their separation during centrifugal separation. Additionally, to coagulate all the oxidized metals and suspended solids aluminum sulfate (Alum) is added after the main reactor tank 318 and before the centrifugal separation.

All suspended solids are removed in the disc bowl centrifuge. The suspended solids are collected at the periphery of the disc bowl centrifuge 334 and intermittently during desludging cycles. At this point in the process the effluent is free from all suspended solids, heavy metals, and soluble organics. The effluent is then passed through an ultra-violet light 338 using 185 nm wavelength to remove all organic carbon. The total organic carbon (TOC) is broken down into CO2 in the presence of hydroxyl radical present in the affluent.

The effluent is then passed through three media tanks 342 containing activated carbon. These filters serve to further polish the effluent and remove any left over heavy metals. In addition the media tanks also break down any remaining ozone and convert it into oxygen. At this stage of filtration the effluent is free from soluble and insoluble oils, heavy metals, and suspended solids.

The effluent is then passed through reverse osmosis (RO) filtration. The RO feed pump passes the effluent through a 1 micron filter 346 which is then fed to five high pressure RO pumps. The RO pumps 348 can operate up to 1000 psi thereby separating permeate and rejecting the brine. To avoid scaling the RO membranes 350 anti-scalant material is fed into the suction inlet of the RO pump. The clean permeate has total dissolved salts in the range of 5~50 PPM. By way of example, is the system is processing 45,000 PPM TDS effluent the resultant TDS in RO reject water will be approximately 80,000 PPM.

It is to be understood that while certain forms of the invention is illustrated, it is not to be limited to the specific form or process herein described and shown. It will be apparent to those skilled in the art that various changes may be made without departing from the scope of the invention and the invention is not to be considered limited to what is shown and described in the specification and drawings.

What is claimed is:

1. A process for treating flowback water including the steps of:
fluidly connecting a source of flowback water to a backwash filter, filtering said flowback water and directing the outlet of the backwash filter to a first inlet of an ozone injector device, fluidly connecting a source of ozone to a second inlet on said ozone injection device, fluidly connecting an outlet of said ozone injector device to an inlet of an ozone contact tank, fluidly connecting an outlet of said ozone contact tank to a first inlet of an inline static mixer, conveying a source of aluminum sulfate to a second inlet of said inline static mixer, conveying the flowback water from an outlet of said inline static mixer to a manifold within a main reactor tank whereby hydrodynamic cavitations are created within said main reactor tank, positioning ultrasonic transducers with said main reactor tanks to create acoustic cavitations within said main reactor tank, positioning at least one anode and at least one cathode within said main reactor tank.

2. A process for treating flowback water as set forth in claim 1 including the steps of: creating a pressure greater than atmospheric pressure within said main reactor tank.

3. A process for treating flowback water as set forth in claim 1 including the steps of; exposing the flowback water with said main treatment tank to at least one pair of ultrasonic transducers operating at approximately at 16 KHz and at least one pair of ultrasonic transducers operating at approximately 20 KHz.

4. A process for treating flowback water as set forth in claim 3 including the step of passing the flowback water through a plurality of media tanks containing activated carbon.

5. A process for treating flowback water as set forth in claim 1 including the steps of; passing the flowback water through reverse osmosis pumps and membranes to thereby produce a first output of clean flowback water and a second output of reject water for disposal.

6. A process for treating flowback water as set forth in claim 1 wherein the equipment for performing the process is assembled as a plurality of removable modules that are mounted on skids that are placed within a standard truck trailer, said trailer moveable from one well site to another by truck, rail or ship.

7. A process for treating flowback water as set forth in claim 1 including the step of conveying the flowback water from an outlet of said main reactor tank to at least one centrifuge that will separate the solids out of the flowback water.

* * * * *